F. H. BEALS.
SEALING DEVICE FOR NEWSPAPERS AND THE LIKE.
APPLICATION FILED NOV. 9, 1910.
Reissued June 23, 1914. 13,754.
Fig. 1.
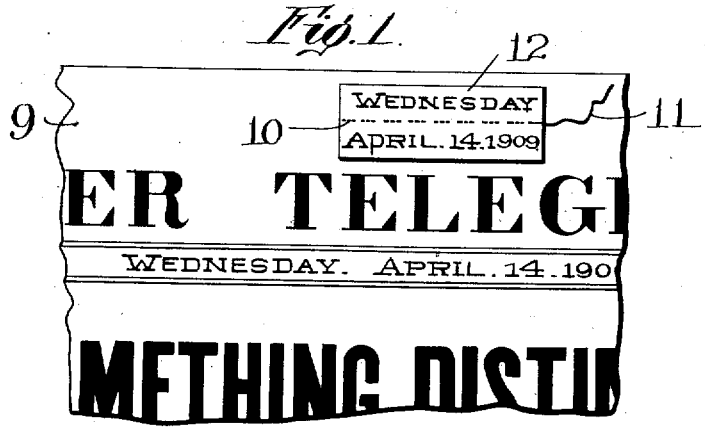
Fig. 2.
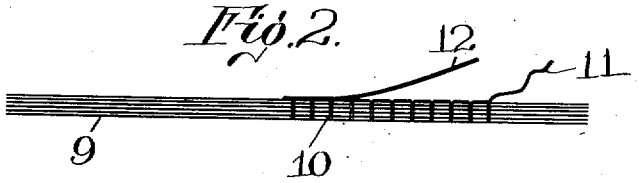
Fig. 3.
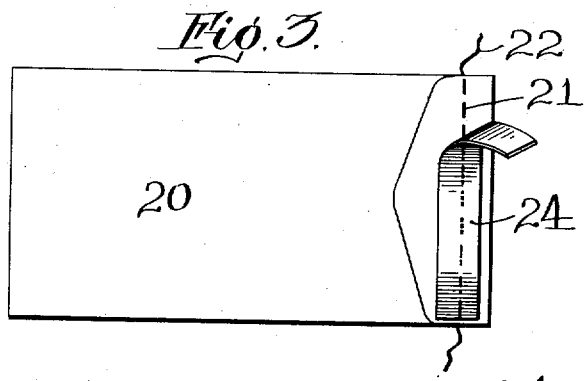
Fig. 4
Witnesses:
C. F. Wesson
E. M. Allen.
Inventor:
F. H. Beals.
by attorneys
Southgate & Southgate.
COLUMBIA PLANOGRAPH CO., WASHINGTON, D. C.

UNITED STATES PATENT OFFICE.

FRANK H. BEALS, OF WORCESTER, MASSACHUSETTS, ASSIGNOR TO UNITED STATES SEALING COMPANY, OF SPRINGFIELD, MASSACHUSETTS, A CORPORATION OF MASSACHUSETTS.

SEALING DEVICE FOR NEWSPAPERS AND THE LIKE.

13,754. Specification of Reissued Letters Patent. Reissued June 23, 1914.

Original No. 965,362, dated July 26, 1910, Serial No. 498,782. Application for reissue filed November 9, 1910. Serial No. 591,525.

*To all whom it may concern:*

Be it known that I, FRANK HERBERT BEALS, a citizen of the United States, residing at Worcester, in the county of Worcester, State of Massachusetts, have invented a new and useful Improvement in Sealing Devices for Newspapers and the like, of which the following is a specification.

This invention relates to the sealing of newspapers, envelops, packages, and the like so that they cannot be opened without ready detection and that unscrupulous persons cannot return papers to the publishers which have been sold or read for the purpose of securing a rebate thereon. This difficulty is one which is of extreme importance in the newspaper business and a number of attempts have been made to provide some means whereby this practice cannot be followed.

One object of this invention is absolutely to prevent the return of papers which have been sold and opened and therefore to provide means whereby the opening of a paper will cause a mutilation of such a character that it cannot again be restored to its original condition. For the purpose of accomplishing this result in the preferred construction the leaves of the paper or a plurality of the leaves, preferably all of them, are temporarily secured together with a thread and the free end of the thread is left projecting, then a seal is applied over the thread so that in opening the paper either by pulling the leaves apart or by pulling on the thread the seal will be mutilated or destroyed. The same principle can be applied to packages, envelops, etc.

The invention also involves additional features as will appear hereinafter.

Reference is to be had to the accompanying drawings in which—

Figure 1 is a portion of a plan of the outside of a newspaper showing a preferred embodiment of the invention applied thereto. Fig. 2 is an end view of the same showing the seal in the act of being applied. Fig. 3 is a plan of an envelop with the invention applied thereto. and Fig. 4 is an edge view thereof.

For the above mentioned purposes, several or all of the sheets of the newspaper 9 or other periodical or the back and front of an envelop or package to which the invention is applied are traversed through by a single thread stitching 10 preferably arranged in a straight line. Each stitch consists of a loop extending through the leaves and not secured on the back so that it is free at its loop end. The end 11 of the thread preferably is left free and projecting from the front face of the article. When this is done, a seal 12 of sheet material is pasted down over the thread so that it adheres to the outer page of the paper or the like and to the thread itself which projects through the same. This seal preferably is printed or stamped with the date of the paper, or with a name or any distinguishing data or ornamentation. The seal, as readily will be understood, can be made of a particular form, engraving, or design on the face as is well understood in the manufacture of checks, bank notes and the like so that it cannot easily be imitated. This is to prevent the substitution of spurious seals for those which have been removed. It will be understood that a seal of this kind preferably is located near the outer edge of the paper so that it will be impossible for a reader to get at the inside of the paper without tearing the paper all around the seal or at least mutilating the seal itself and removing the thread. The ordinary way of unsealing the paper is to grasp the end of the thread and pull the same backward through the seal 12 thus cutting the seal in two and removing the stitching from the leaves. As the seal adheres to the thread, the act of pulling the thread out longitudinally even will break the seal no matter how carefully done. This can be done very readily with single thread stitching. If the leaves are torn apart in any other way they will be so thoroughly mutilated that they could not possibly be returned as unsold papers.

Figs. 3 and 4 show the invention as applied in another way. In this case an envelop 20 is made long enough so that the contents can be held in it with the end projecting from the same. This end is then doubled over and the stitching 21 applied in the same manner as indicated in Figs. 1 and 2, or if desired, it can be extended clear across the end of the envelop, as indicated in Fig. 3. This stitching preferably is made with a single thread, as above indicated, so that when the end 22 thereof is pulled the stitches will give way readily and thus break through the seal 24 which is applied to the outer surface and preferably directly on the stitches and envelop alike. This form of the invention is of particular value for use in offices where a large number of envelops or packages of a similar nature are sealed, so as to permit the use of the distinguishing seal 24 which will show what office the package comes from and also preferably the date and such other data as may be desired. These seals can be made with other distinguishing characteristics, as indicated above. The package or envelop can be sealed in the ordinary way in addition to this seal.

While I have illustrated and described a preferred embodiment of the invention I am aware that many modifications can be made in the same without departing from the scope of the invention as expressed in the claims. Therefore, I do not wish to be limited to all the details shown and described, but What I do claim is:—

1. The combination with an article of the character described, consisting of a plurality of leaves connected together along one edge, of a sealing device fastened thereto at a distance from said edge of the article, said sealing device consisting of a thread withdrawably passed through the leaves at a plurality of points, thus fastening the leaves together and forming a plurality of loops of the thread extending through from the outside of one of the outside leaves, said thread being adapted to be readily removed by pulling on one end, and a readily destructible seal pasted to the article so as to cover and adhere to the thread between a plurality of the loops, one end of the thread extending from under the seal and being free, whereby when the thread is pulled to free the leaves from each other it simultaneously mutilates the seal.

2. The combination with an article of the character described, embodying a plurality of paper leaves connected along one edge, of a sealing device applied to the article at a distance from said edge, said sealing device consisting of a readily-unravelable single thread stitching comprising a plurality of stitches extending through said leaves to fasten them together and having a free end adapted to be pulled to unravel said stitching and thus free the leaves from each other and expose to view the mutilations caused by the stitching.

3. The combination with an article of the character described, embodying sheets folded to form a plurality of leaves, of a sealing device therefor attached to the article at a distance from its folded edge, said sealing device consisting of a thread formed into a plurality of loops which extend through the leaves of the article at separated points, said thread being readily removable by pulling on one end thereby freeing the leaves from each other and exposing holes in the leaves caused by the loops extending therethrough.

4. The combination with a newspaper composed of a plurality of leaves, of a sealing device attached thereto at a considerable distance from its back, said sealing device consisting of a single thread withdrawably passed through the leaves of the newspaper at a plurality of points and thus serving to fasten the leaves together, said thread being adapted to be withdrawn by pulling on one end, the withdrawal of the thread in this manner freeing the leaves and at the same time exposing the mutilations caused by passing the thread through the leaves.

5. The combination with an article of the character described, embodying a plurality of paper leaves connected along one edge, of a sealing device applied to the article at a distance from said edge, said sealing device consisting of a single thread formed into a series of loops which extend through holes in the leaves located at separated points, all said loops entering the leaves from the same side of the article and both strands of each loop entering one of the holes, whereby if the leaves are stripped off the loops without tearing the leaves they will be left mutilated by the holes.

6. The combination with a plurality of leaves connected together along one edge, of a sealing device fastened thereto at a distance from said edge, said sealing device consisting of a thread withdrawably passed through the leaves at a few adjacent points in alinement, thus fastening the leaves together and forming a plurality of loops of the thread extending through the leaves from the outside of one of the outside leaves, and a readily destructible seal pasted to the article so as to cover and adhere to the thread between a plurality of the loops thereof.

7. The combination with a plurality of leaves of paper connected together along one edge, of a sealing device applied thereto at a considerable distance from said secured edges, said sealing device consisting of a line of readily unravelable single-thread-stitching extending through said leaves and having a free end which can be pulled to unravel said stitching and thus release the leaves.

In testimony whereof I have hereunto set my hand, in the presence of two subscribing witnesses.

FRANK H. BEALS.

Witnesses:
ALBERT E. FAY,
C. FORREST WESSON.

Copies of this patent may be obtained for five cents each, by addressing the "Commissioner of Patents, Washington, D. C."